(12) United States Patent
Chae et al.

(10) Patent No.: US 8,478,302 B2
(45) Date of Patent: Jul. 2, 2013

(54) APPARATUS AND METHOD FOR TRANSMITTING AND RECEIVING LOCATION BASED SERVICE RESOURCE ALLOCATION INFORMATION IN A MOBILE COMMUNICATION SYSTEM

(75) Inventors: Seong-Hyeon Chae, Seongnam-si (KR);
Sang-Heon Kim, Suwon-si (KR);
Hee-Won Kang, Seongnam-si (KR);
Jin-Hee Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/176,955

(22) Filed: Jul. 6, 2011

(65) Prior Publication Data

US 2012/0009945 A1    Jan. 12, 2012

(30) Foreign Application Priority Data

Jul. 7, 2010    (KR) .................. 10-2010-0065577

(51) Int. Cl.
*H04W 4/02* (2009.01)
(52) U.S. Cl.
USPC .................. 455/456.3; 370/329; 455/509
(58) Field of Classification Search
USPC .. 455/414.1, 422.1, 450–452.2, 456.1–456.6;
370/328–338, 350, 431, 437, 458, 459
See application file for complete search history.

(56) References Cited

U.S. PATENT DOCUMENTS

| | | | | |
|---|---|---|---|---|
| 6,424,840 | B1* | 7/2002 | Fitch et al. | 455/456.1 |
| 2007/0171864 | A1* | 7/2007 | Zhang et al. | 370/329 |
| 2008/0049668 | A1* | 2/2008 | Kakura et al. | 370/329 |
| 2010/0232398 | A1* | 9/2010 | Lim et al. | 370/336 |
| 2011/0110338 | A1* | 5/2011 | Khoryaev et al. | 370/335 |
| 2012/0094687 | A1* | 4/2012 | Choi et al. | 455/456.1 |
| 2012/0157117 | A1* | 6/2012 | Choi et al. | 455/456.1 |

* cited by examiner

*Primary Examiner* — Kashif Siddiqui
(74) *Attorney, Agent, or Firm* — Jefferson IP Law, LLP (57) ABSTRACT

A method, an Advanced Base Station (ABS) and an Advanced Mobile Station (AMS) for transmitting Location Based Service (LBS) resource allocation information by an ABS in a mobile communication system are provided. The ABS transmits LBS resource allocation information including LBS zone configuration information representing an LBS zone transmission period. The LBS zone configuration information includes at least one of first information indicating that LBS zone transmission is switched off, second information indicating that the LBS zone transmission period corresponds to a first number of super frames, third information indicating that the LBS zone transmission period corresponds to a second number of super frames, and fourth information indicating that the LBS zone transmission period corresponds to a third number of super frames.

20 Claims, 9 Drawing Sheets

APPARATUS AND METHOD FOR TRANSMITTING AND RECEIVING LOCATION BASED SERVICE RESOURCE ALLOCATION INFORMATION IN A MOBILE COMMUNICATION SYSTEM

PRIORITY

This application claims the benefit under 35 U.S.C. §119 (a) of a Korean patent application filed in the Korean Intellectual Property Office on Jul. 7, 2010 and assigned Serial No. 10-2010-0065577, the entire disclosure of which is hereby incorporated by reference.

BACKGROUND OF THE INVENTION

1. Field of the Invention

The present invention relates to an apparatus and method for transmitting and receiving Location Based Service (LBS) resource allocation information in a mobile communication system.

2. Description of the Related Art

Mobile communication systems have evolved to provide not only the existing voice services but also various additional value-added services. Recently, the profits in the mobile communication market created by voice services have been saturated. Accordingly, the communication service providers are seeking additional profits by providing a variety of value-added services differentiated from the voice services, including an LBS-based on-location information for Mobile Stations (MSs). Typical examples of the LBS may include a friend finder service, a location finder service, and a car navigation service.

With the development of mobile communication systems, services provided by the mobile communication systems have been diversified. Performance of mobile communication systems typically depends on high-speed transmission/reception of a large volume of data. For high-speed transmission/reception of mass data in the mobile communication systems, a variety of standards are now in development. The typical standard is the Institute of Electrical and Electronics Engineers (IEEE) 802.16m standard, which is now under standardization.

Recently, user needs for the LBS have grown exponentially. However, while the IEEE 802.16m standard now under standardization has specified a plan to provide the LBS, the IEEE has not proposed a detailed method for providing the LBS, i.e., a detailed method for LBS resource allocation and transmission/reception of LBS resource allocation information.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for transmitting and receiving LBS resource allocation information in a mobile communication system.

In accordance with an aspect of the present invention, a method for transmitting Location Based Service (LBS) resource allocation information by an Advanced Base Station (ABS) in a mobile communication system is provided. The method includes transmitting LBS resource allocation information including LBS zone configuration information representing an LBS zone transmission period. The LBS zone configuration information includes at least one of first information indicating that LBS zone transmission is switched off, second information indicating that the LBS zone transmission period corresponds to a first number of super frames, third information indicating that the LBS zone transmission period corresponds to a second number of super frames, and fourth information indicating that the LBS zone transmission period corresponds to a third number of super frames.

In accordance with another aspect of the present invention, a method for receiving LBS resource allocation information by an Advanced Mobile Station (AMS) in a mobile communication system is provided. The method includes receiving LBS resource allocation information including LBS zone configuration information representing an LBS zone transmission period. The LBS zone configuration information includes at least one of first information indicating that LBS zone transmission is switched off, second information indicating that the LBS zone transmission period corresponds to a first number of super frames, third information indicating that the LBS zone transmission period corresponds to a second number of super frames, and fourth information indicating that the LBS zone transmission period corresponds to a third number of super frames.

In accordance with another aspect of the present invention, an ABS in a mobile communication system is provided. The ABS includes a transmission unit for transmitting LBS resource allocation information including LBS zone configuration information representing an LBS zone transmission period. The LBS zone configuration information includes at least one of first information indicating that LBS zone transmission is switched off, second information indicating that the LBS zone transmission period corresponds to a first number of super frames, third information indicating that the LBS zone transmission period corresponds to a second number of super frames, and fourth information indicating that the LBS zone transmission period corresponds to a third number of super frames.

In accordance with another aspect of the present invention, an AMS in a mobile communication system is provided. The AMS includes a reception unit for receiving LBS resource allocation information including LBS zone configuration information representing an LBS zone transmission period. The LBS zone configuration information includes at least one of first information indicating that LBS zone transmission is switched off, second information indicating that the LBS zone transmission period corresponds to a first number of super frames, third information indicating that the LBS zone transmission period corresponds to a second number of super frames, and fourth information indicating that the LBS zone transmission period corresponds to a third number of super frames.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for transmitting and receiving Location Based Service (LBS) resource allocation information in a mobile communication system. Although an Institute of Electrical and Electronics Engineers (IEEE) 802.16m communication system will be considered as the mobile communication system in the following description, it will be apparent to those skilled in the art that other mobile communication systems may also be employed, such as the Worldwide Interoperability for Microwave Access-(WiMAX) communication system. The LBS resource used in the IEEE 802.16m communication system will be referred herein to as an 'Enhanced LBS Zone (E-LBS Zone)'.

Figure 1:
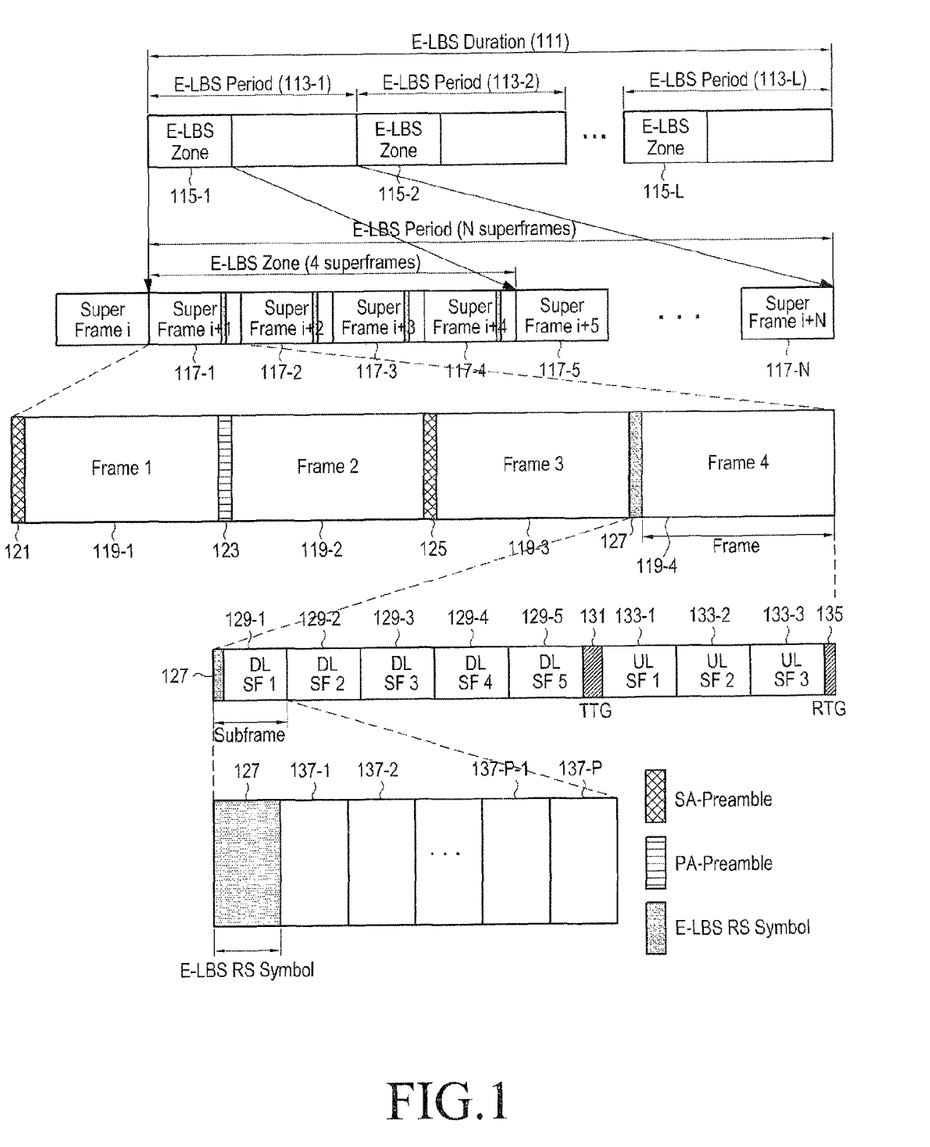
FIG. 1 is a diagram schematically illustrating allocation of Enhanced Location-Based Service (E-LBS) Zones in an Institute of Electrical and Electronics Engineers (IEEE) 802.16m communication system according to an exemplary embodiment of the present invention.

FIG. 1 schematically illustrates allocation of E-LBS Zones in an IEEE 802.16m communication system according to an exemplary embodiment of the present invention.

Referring to FIG. 1, an E-LBS Duration 111 includes a plurality of L E-LBS Periods 113-1~113-L. Each of the L E-LBS Periods 113-1~113-L includes one E-LBS Zone. The E-LBS Period 113-1 includes an E-LBS Zone 115-1, the E-LBS Period 113-2 includes an E-LBS Zone 115-2, and the last E-LBS Period 113-L includes an E-LBS Zone 115-L.

Each of the E-LBS Zones 115-1~115-L includes M (for example, M=4) super frames, and each of the 4 super frames includes S (for example, S=4) frames. One of the 4 frames, such as the last frame, is used to transmit an E-LBS Reference Signal (E-LBS RS) symbol.

A structure of the E-LBS Period 113-1, an example of the E-LBS Zone, is described below.

The E-LBS Period 113-1 includes a plurality of N super frames, i.e., a super frame #(i+1) 117-1 to a super frame #(i+N) 117-N. Four super frames, i.e., the super frame #(i+1) 117-1 to the super frame #(i+4) 117-4 are included in the E-LBS Zone 115-1. Each of the super frame #(i+1) 117-1 to the super frame #(i+4) 117-4 includes 4 frames, and one frame, such as the last frame, is used to transmit an E-LBS RS symbol.

Transmission of an E-LBS RS symbol in, for example, the super frame #(i+1) 117-1, will now be described below.

The super frame #(i+1) 117-1 includes a frame #1 119-1 to a frame #4 119-4, and the frame #4 119-4 includes an E-LBS RS symbol region 127, P (for example, P=5) DownLink (DL) Sub Frames (SFs), i.e., a DL SF #1 129-1 to a DL SF #5 129-5, a Transmit Transition Gap (TTG) 131, Q (for example, Q=3) UpLink (UL) SFs, i.e., a UL SF #1 133-1 to a UL SF #3 133-3, and a Receive Transition Gap (RTG) 135. The DL SF #1 129-1 includes the E-LBS RS symbol region 127, and P data burst regions, i.e., a data burst region 137-1 to a data burst region 137-P.

The frame #1 119-1 includes a Secondary Advanced Preamble (SA-Preamble) region 121, the frame #2 119-2 includes a Primary Advanced Preamble (PA-Preamble) region 123, and the frame #3 119-3 includes an SA-Preamble region 125.

Although not separately illustrated in FIG. 1, one of the frames included in each super frame, such as the first frame, includes a Super Frame Header (SFH) region.

A structure of the E-LBS Period will now be described below with reference to FIGS. 2 to 4.

A structure of an E-LBS Period including 8 super frames in an IEEE 802.16m communication system according to an exemplary embodiment of the present invention is described below with reference to FIG. 2.

Figure 2:
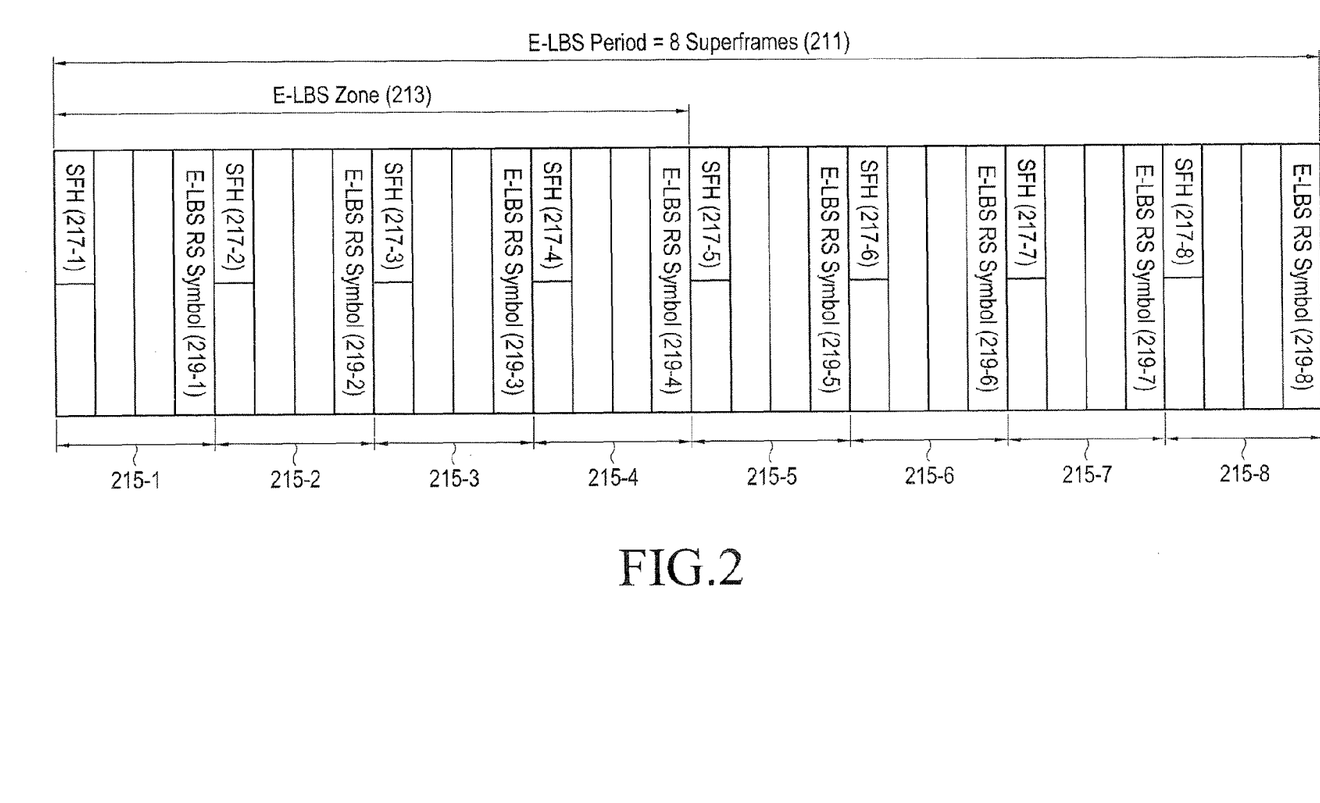
FIG. 2 is a diagram schematically illustrating a structure of an E-LBS Period including 8 super frames in an IEEE 802.16m communication system according to an exemplary embodiment of the present invention.

FIG. 2 schematically illustrates a structure of an E-LBS Period including 8 super frames in an IEEE 802.16m communication system according to an exemplary embodiment of the present invention.

Referring to FIG. 2, an E-LBS Period 211 includes 8 super frames, i.e., a super frame 215-1 to a super frame 215-8. The super frame 215-1 and the super frame 215-4 are included in an E-LBS Zone 213. Each of the super frames 215-1 to the super frame 215-8 includes an SFH region. The super frame 215-1 includes an SFH region 217-1, the super frame 215-2 includes an SFH region 217-2, and the last super frame 215-8 includes an SFH region 217-8.

Each of the super frame 215-1 to the super frame 215-4 included in the E-LBS Zone 213 includes 4 frames, and the last frame among the 4 frames includes an E-LBS RS symbol region. The super frame 215-1 includes an E-LBS RS symbol region 219-1, the super frame 215-2 includes an E-LBS RS symbol region 219-2, the super frame 215-3 includes an E-LBS RS symbol region 219-3, and the super frame 215-4 includes an E-LBS RS symbol region 219-4.

A structure of an E-LBS Period including 16 super frames in an IEEE 802.16m communication system according to an exemplary embodiment of the present invention is described below with reference to FIG. 3.

Figure 3:
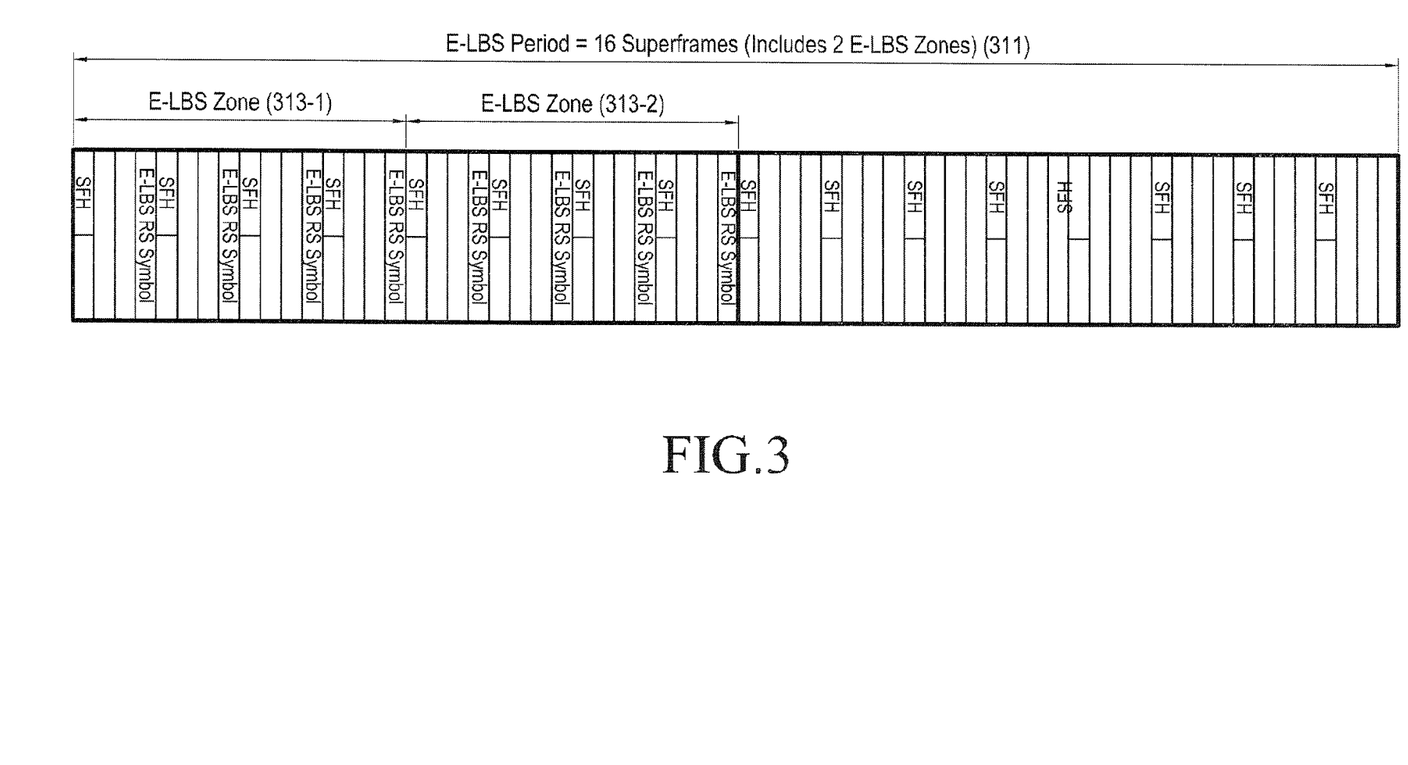
FIG. 3 is a diagram schematically illustrating a structure of an E-LBS Period including 16 super frames in an IEEE 802.16m communication system according to an exemplary embodiment of the present invention.

FIG. 3 schematically illustrates a structure of an E-LBS Period including 16 super frames in an IEEE 802.16m communication system according to an exemplary embodiment of the present invention.

Referring to FIG. 3, an E-LBS Period 311 includes 16 super frames. Four super frames are included in an E-LBS Zone 313-1, and 4 other super frames are included in an E-LBS Zone 313-2. Internal structures of the E-LBS Zone 313-1 and the E-LBS Zone 313-2 are the same as that of the E-LBS Zone 213, described with reference to FIG. 2, so a detailed description thereof will be omitted herein.

A structure of an E-LBS Period including 32 super frames in an IEEE 802.16m communication system according to an exemplary embodiment of the present invention will be described with reference to FIG. 4.

Figure 4:
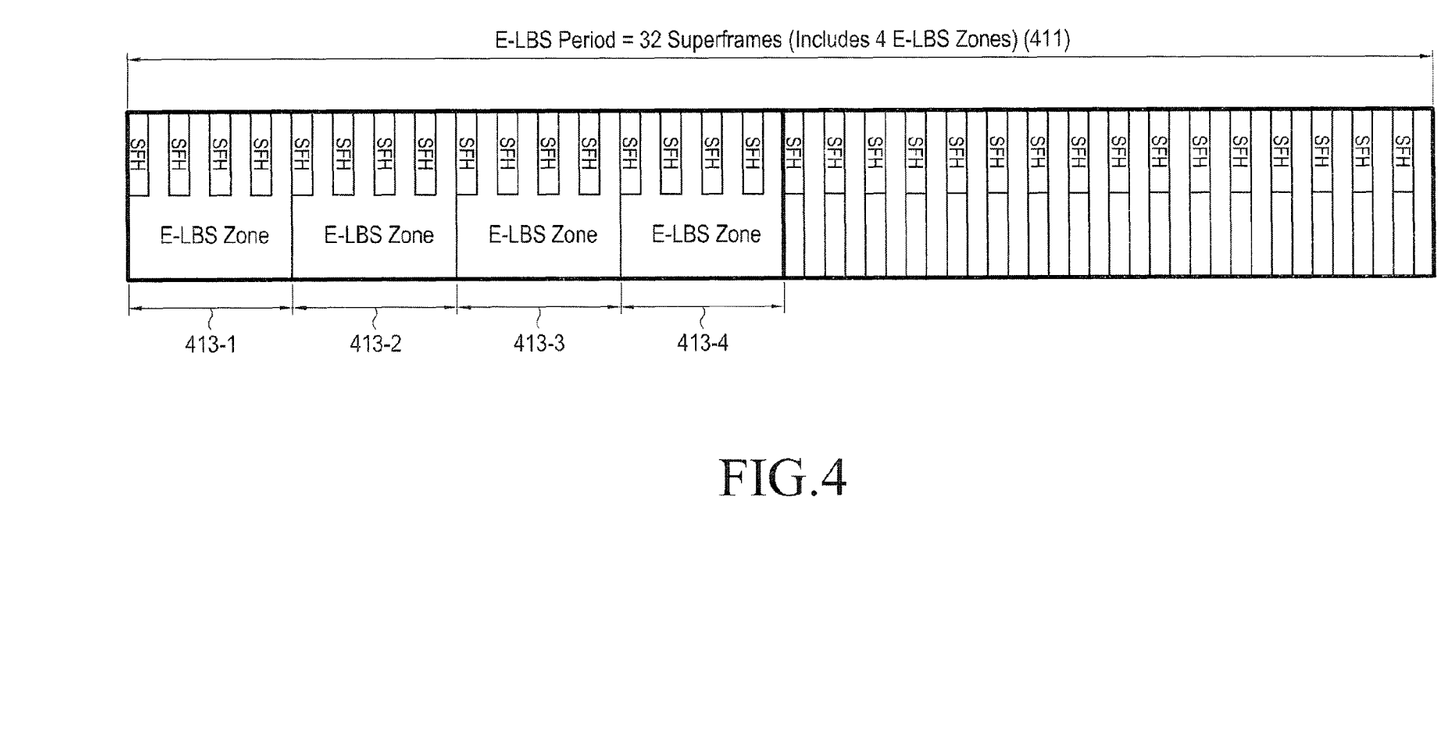
FIG. 4 is a diagram schematically illustrating a structure of an E-LBS Period including 32 super frames in an IEEE 802.16m communication system according to an exemplary embodiment of the present invention.

FIG. 4 schematically illustrates a structure of an E-LBS Period including 32 super frames in an IEEE 802.16m communication system according to an exemplary embodiment of the present invention.

Referring to FIG. 4, an E-LBS Period 411 includes 32 super frames. Four super frames are included in an E-LBS Zone 413-1, 4 super frames are included in an E-LBS Zone 413-2, 4 super frames are included in an E-LBS Zone 413-3, and 4 super frames are included in an E-LBS Zone 413-4. Internal structures of the E-LBS Zone 413-1 to the E-LBS Zone 413-4 are the same as that of the E-LBS Zone 213, described with reference to FIG. 2, so a detailed description thereof will be omitted herein.

With respect to the E-LBS Period structures illustrated in FIGS. 2 to 4, E-LBS Zones are allocated to have a set pattern to correspond to the E-LBS Period. In the E-LBS Period structures described with reference to FIGS. 2 to 4, half of the E-LBS Period is allocated for E-LBS Zones, while the other half is not allocated for E-LBS Zones.

When the E-LBS Zones are allocated to have a set pattern to correspond to the E-LBS Period, this will be referred to as 'periodic E-LBS Zone allocation', and it will be assumed that during the periodic E-LBS Zone allocation, an Advanced Base Station (ABS) transmits E-LBS Zone resource allocation information using, for example, an Advanced Air Interface System Configuration Descriptor (AAI_SCD) message. A format of the AAI_SCD message is as shown in Table 1 below.

TABLE 1

| M/O | Attributes | Size (bits) | Value/Note | Conditions |
|---|---|---|---|---|
| O | E-LBS Configuration Parameters | $D_{LBS}$ TBD | Indicates the time during which the E-LBS service lasts. N* 640 ms | Present when E-LBS is configured |
|  | E-LBS Configuration Parameters | $P_{LBS}$ 2 | Indicates the period with which the same E-LBS zone configuration is repeated. 0b00: 8 superframes, 160 ms 0b01: 16 superframes, 320 ms 0b10: 32 superframes, 640 ms 0b11: 64 superframes, 1280 ms |  |

In Table 1, $D_{LBS}$ represents duration for which an E-LBS lasts, i.e., represents E-LBS Duration. During $D_{LBS}$, E-LBS Zones are allocated to correspond to a set pattern. A value of $D_{LBS}$ is N (for example, N=24), and if N is, for example, 24, the E-LBS lasts for duration of 24*640 [ms]. 640[ms] is changeable to another value, and $D_{LBS}$ represents E-LBS Duration in units of 640 [ms].

In addition, $P_{LBS}$ represents a period for which the set pattern is repeated, i.e., represents an LBS zone transmission period. The $P_{LBS}$ may be implemented with, for example, 2 bits. If the bit value is '00', the set pattern is repeated every 8 super frames. If the bit value is '01', the set pattern is repeated every 16 super frames. If the bit value is '10', the set pattern is repeated every 32 super frames. If the bit value is '11', the set pattern is repeated every 64 super frames. The set pattern is an E-LBS Zone configuration pattern, and thus, the $P_{LBS}$ represents a period for which the same E-LBS Zone configuration is repeated. In Table 1, a one-super frame period is assumed to be 20 [ms].

When an ABS transmits E-LBS resource allocation information using the AAI_SCD message, an Advanced Mobile Station (AMS) may detect a location of an E-LBS Zone using the $P_{LBS}$.

According to an exemplary embodiment of the present invention, periodic E-LBS Zone allocation is allowed to be performed using the pattern in which E-LBS Zones are allocated for half of $P_{LBS}$ and no E-LBS Zones are allocated for the other half as described with reference to FIGS. 2 to 4. In this case, however, an AMS should be able to detect a location where an E-LBS Zone starts, or is switched on. As for the location where an E-LBS Zone is switched on, the location is assumed to be fixed to the super frame meeting the conditions as shown in Table 1.

Even though an ABS does not separately inform an AMS of an E-LBS Zone switched-on location, the AMS may determine the location where an E-LBS Zone is switched on. Herein, both the ABS and the AMS are assumed to know in advance that the E-LBS Zone switched-on location is determined in accordance with Equation (1):

$$N_{superframe} \bmod P_{LBS} = 0 \quad \text{Equation (1)}$$

where $N_{superframe}$ represents a super frame index, and mod represents a modulo operation. Upon receiving an AAI_SCD message from an ABS, an AMS checks a super frame index, and performs modulo operation on the super frame index $N_{superframe}$ with $P_{LBS}$ in accordance with Equation (1). The AMS detects a super frame where the operation result is 0, as an E-LBS Zone switched-on location.

In the foregoing description made with reference to FIGS. 2 to 4, periodic E-LBS Zone allocation is performed using the half pattern in which E-LBS Zones are allocated for half of $P_{LBS}$ and no E-LBS zones are allocated for the other half. The half pattern used for E-LBS Zone allocation in FIGS. 2 to 4 is a pattern for allocating E-LBS Zones such that among super frames corresponding to $P_{LBS}$, super frames corresponding to half, starting with a super frame whose super frame index is 0, are allocated for E-LBS Zones, and super frames corresponding to the other half are not allocated for E-LBS Zones.

To allocate E-LBS Zones more flexibly, E-LBS Zones may be allocated using various other patterns in addition to the half pattern described with reference to FIGS. 1 to 4. In this case, an ABS transmits E-LBS Zone resource allocation information using an AAI_SCD message in a new format different from the AAI_SCD message format described with reference to Table 1. The new format of an AAI_SCD message is as shown in Table 2 below.

Figure 5:
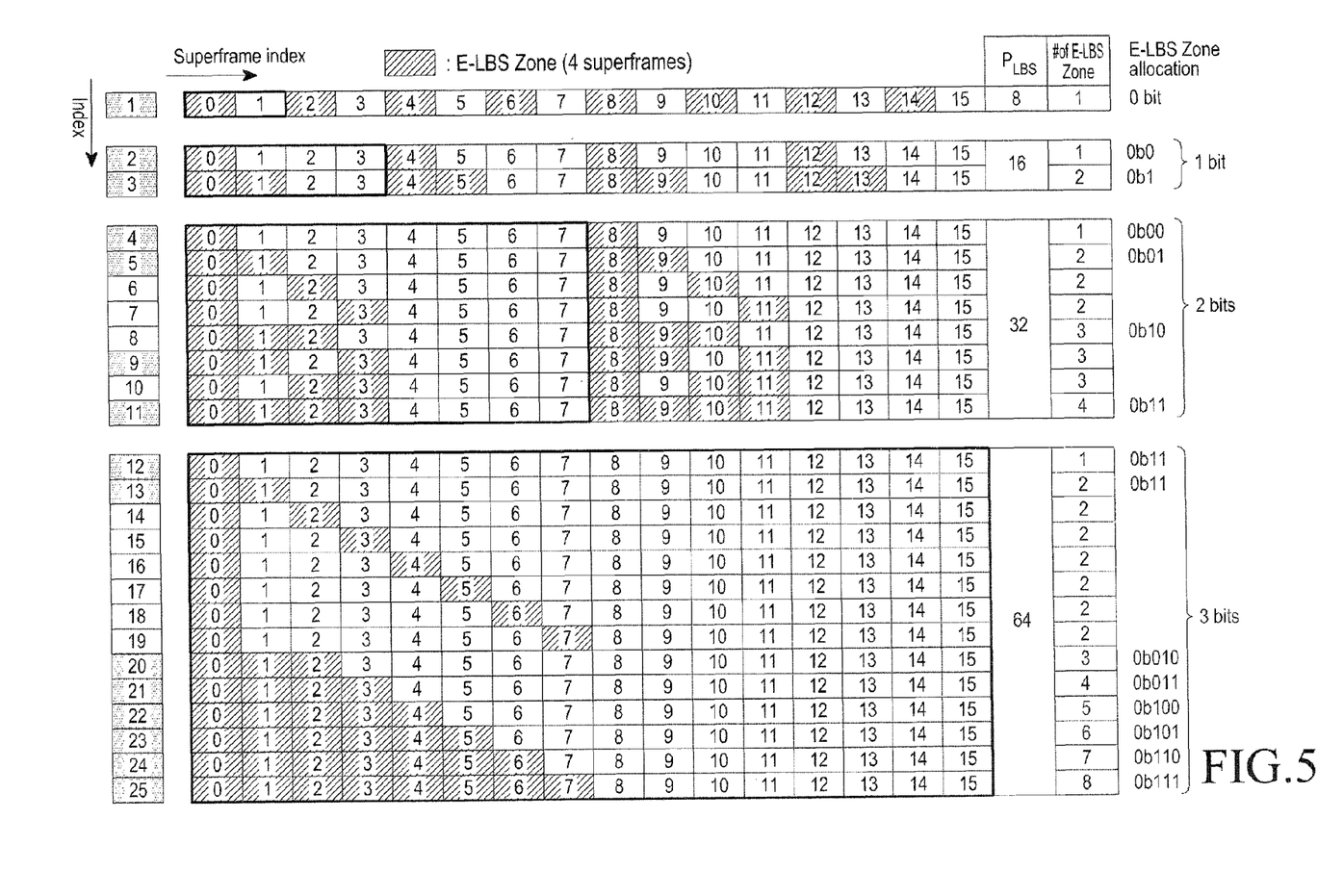
FIG. 5 is a diagram schematically illustrating a relationship between an E-LBS Period and an 'E-LBS zone allocation' in an IEEE 802.16m communication system according to an exemplary embodiment of the present invention.

FIG. 5 schematically illustrates a relationship between an E-LBS Period and an 'E-LBS zone allocation' in an IEEE 802.16m communication system according to an exemplary embodiment of the present invention.

Referring to FIG. 5, in a case where $P_{LBS}$ represents 8 super frames, i.e., a bit value of $P_{LBS}$ is '00', E-LBS Zones are allocated as represented by an index #1, because only a half pattern is an available pattern. Because this case corresponds to the case of the $P_{LBS}$ bit value='00' described with reference to Table 1, 'E-LBS zone allocation' is not required to be additionally included in an AAI_SCD message. In this case, therefore, the AAI_SCD message has the same format as that described with reference to Table 1.

On the other hand, when $P_{LBS}$ represents 16 super frames, 32 super frames, or 64 super frames, many different 'E-LBS Zone allocation' types are available according to the pattern used, and the number of E-LBS Zones allocated during $P_{LBS}$. A detailed description thereof will be made below.

First, a case where $P_{LBS}$ represents 16 super frames, i.e., a bit value of $P_{LBS}$ is '01' will be described below.

If a ¼ pattern is used and the number of E-LBS Zones allocated during $P_{LBS}$ is 1, E-LBS Zones are allocated as represented by an index #2. On the other hand, if a half pattern is used and the number of E-LBS Zones allocated during $P_{LBS}$ is 2, E-LBS Zones are allocated as represented by an index #3. Therefore, 'E-LBS zone allocation' implemented with a 1 bit indicates whether E-LBS Zones are allocated as represented by the index #2, or E-LBS Zones are allocated as represented by the index #3.

Second, a case where $P_{LBS}$ represents 32 super frames, i.e., a bit value of $P_{LBS}$ is 10', will be described below.

TABLE 2

| M/O | Attributes | | Size (bits) | Value/Note | Conditions |
|---|---|---|---|---|---|
| O | E-LBS Configuration Parameters | $D_{LBS}$ | TBD | Indicates the time during which the E-LBS service lasts. N* 640 ms | Present when E-LBS is configured |
| | E-LBS Configuration Parameters | $P_{LBS}$ | 2 | Indicates the period with which the same E-LBS zone configuration is repeated. 0b00: 8 superframes, 160 ms 0b01: 16 superframes, 320 ms 0b10: 32 superframes, 640 ms 0b11: 64 superframes, 1280 ms | |
| | E-LBS Configuration Parameters | E-LBS zone allocation | variable | Indicates the number of the E-LBS zones and the E-LBS zone configuration in $P_{LBS}$. $P_{LBS}$ = 0b00: no bit is needed. $P_{LBS}$ = 0b01: 1 bit $P_{LBS}$ = 0b10: 2 bit $P_{LBS}$ = 0b11: 3 bit | |

In Table 2, $D_{LBS}$ and $P_{LBS}$ are the same as those described with reference to Table 1, so a detailed description thereof will be omitted herein.

In addition, 'E-LBS zone allocation' represents the number of E-LBS Zones allocated during $P_{LBS}$, and an E-LBS Zone configuration pattern. The 'E-LBS zone allocation' may be included or not included in the AAI_SCD message according to the number of E-LBS Zones allocated during $P_{LBS}$, and the E-LBS Zone configuration pattern. When included in the AAI_SCD message, the 'E-LBS zone allocation' may be implemented with 1 bit, 2 bits, or 3 bits. A relationship between an E-LBS Period and an 'E-LBS zone allocation' in an IEEE 802.16m communication system according to an exemplary embodiment of the present invention is described below with reference to FIG. 5.

If a ⅛ pattern is used and the number of E-LBS Zones allocated during $P_{LBS}$ is 1, E-LBS Zones are allocated as represented by an index #4. If a ¼ pattern is used and the number of E-LBS Zones allocated during $P_{LBS}$ is 2, E-LBS Zones are allocated as represented by any one of indexes #5 to #7. If a ⅜ pattern is used and the number of E-LBS Zones allocated during $P_{LBS}$ is 3, E-LBS Zones are allocated as represented by any one of indexes #8 to #10. Finally, if a half pattern is used and the number of E-LBS Zones allocated during $P_{LBS}$ is 4, E-LBS Zones are allocated as represented by an index #11.

However, if the number of super frames allocated for one E-LBS Zone is 5 or more, its 'E-LBS zone allocation' is not so different from the 'E-LBS zone allocation' for the case where $P_{LBS}$ is short. Accordingly, if the period is limited to a half period or less, a total of 4 'E-LBS zone allocation' types corresponding to the indexes #4, #5, #8, and #11 are present.

For example, if $P_{LBS}$ represents 32 super frames, a pattern for allocating E-LBS resources on a 32-super frame basis is repeated. If $P_{LBS}$ represents 32 super frames, a total of 8 E-LBS Zones may be allocated for the period $P_{LBS}$. If 4 E-LBS Zones among them are allocated, a reuse is 2. This 'E-LBS zone allocation' is similar to that in the case where $P_{LBS}$ represents 16 super frames and a total of 2 E-LBS Zones are allocated for the period $P_{LBS}$, and that in another case where $P_{LBS}$ represents 8 super frames and one E-LBS Zone is allocated for the period $P_{LBS}$. Accordingly, an 'E-LBS zone allocation' type only with reuse 2 is present in the period $P_{LBS}$ representing 8 super frames; 'E-LBS zone allocation' types with reuse 2 and 4 are present in the period $P_{LBS}$ representing 16 super frames; and 'E-LBS zone allocation' types with reuse 2, 8/3, 4, 8 are present in the period $P_{LBS}$ representing 32 super frames, making it possible to represent every case.

The period is limited to a half period or less in order to restrict the utilization of E-LBS Zones not to exceed reuse 2 in the period. Accordingly, 'E-LBS zone allocation' implemented with 2 bits indicates any one of the types corresponding to the indexes #4, #5, #8, and #11, in which E-LBS zones are allocated.

A case where $P_{LBS}$ represents 64 super frames, i.e., a bit value of $P_{LBS}$ is '11', is described below.

If a 1/16 pattern is used and the number of E-LBS Zones allocated during $P_{LBS}$ is 1, an E-LBS Zone is allocated as represented by an index #12. If a 1/8 pattern is used and the number of E-LBS Zones allocated during $P_{LBS}$ is 2, E-LBS Zones are allocated as represented by any one of indexes #13 to #19. If a 3/16 pattern is used and the number of E-LBS Zones allocated during $P_{LBS}$ is 3, E-LBS Zones are allocated as represented by an index #20. If a 1/4 pattern is used and the number of E-LBS Zones allocated during $P_{LBS}$ is 4, E-LBS Zones are allocated as represented by an index #21. If a 5/16 pattern is used and the number of E-LBS Zones allocated during $P_{LBS}$ is 5, E-LBS Zones are allocated as represented by an index #22. If a 3/8 pattern is used and the number of E-LBS Zones allocated during $P_{LBS}$ is 6, E-LBS Zones are allocated as represented by an index #23. If a 7/16 pattern is used and the number of E-LBS Zones allocated during $P_{LBS}$ is 7, E-LBS Zones are allocated as represented by an index #24. Finally, if a half pattern is used and the number of E-LBS Zones allocated during $P_{LBS}$ is 8, E-LBS Zones are allocated as represented by an index #25.

As in the case where $P_{LBS}$ represents 32 super frames, even in the case where $P_{LBS}$ represents 64 super frames, a total of 8 'E-LBS zone allocation' types corresponding to the indexes #12, #13, and #20 to #25, rather than 'E-LBS zone allocation' types corresponding to all of the indexes #12 to #25, are present. Accordingly, 'E-LBS zone allocation' implemented with 3 bits indicates any one of the types corresponding to the indexes #12, #13, and #20 to #25, in which E-LBS zones are allocated.

In the foregoing description, an E-LBS Zone switched-on location is fixed in accordance with Equation (1). The E-LBS Zone switched-on location is fixed on the assumption that the E-LBS is continuously provided. However, the E-LBS may not be continuously provided. In this case, an ABS should provide an AMS with information indicating whether the ABS provides the E-LBS or not, using a message, for example, an AAI_SCD message. A format of the AAI_SCD message including information indicating the provision/non-provision of the E-LBS is as shown in Table 3 below.

TABLE 3

| M/O | Attributes | Size (bits) | Value/Note | Conditions |
|---|---|---|---|---|
| O | E-LBS Configuration Parameters | E-LBS-Zone Indicator 1 | Indicates whether E-LBS zone exists or not until the next AAI-SCD message will be transmitted. 0b0: E-LBS zone doesn't exist. 0b1: E-LBS zone exists. | Present when E-LBS is configured |

In Table 3, an E-LBS Zone Indicator represents whether an E-LBS Zone is present until the next AAI_SCD message is transmitted. This may be implemented with, for example, 1 bit.

An ABS indicates whether it manages E-LBS Zones, using an E-LBS Zone Indicator included in an AAI_SCD message, and using the E-LBS Zone Indicator, an AMS determines whether the ABS manages E-LBS Zones, until it receives the next AAI_SCD message. Upon receiving the next AAI_SCD message, the AMS determines if there is a change, using an AAI_SCD change counter. If so, the AMS determines if there is any change in an E-LBS Zone Indicator included in the AAI_SCD message. If there is no change, the AMS having been managing E-LBS Zones maintains the service continuously.

If a specific ABS does not provide the E-LBS only in a specific period, the ABS may simply transmit an AAI_SCD message including the E-LBS Zone Indicator described with reference to Table 3, instead of the $D_{LBS}$ described with reference to Tables 1 and 2.

While allocating E-LBS Zones using the above-described scheme, if an ABS needs to change the current E-LBS Zone allocation scheme, such as changing its operation mode to a mixed mode, or changing the frame structure itself, then the ABS may change the E-LBS Zone allocation scheme or stop the E-LBS Zone allocation. A process of changing an E-LBS Zone allocation scheme in an IEEE 802.16m communication system according to an exemplary embodiment of the present invention is described below with reference to FIG. 6.

Figure 6:
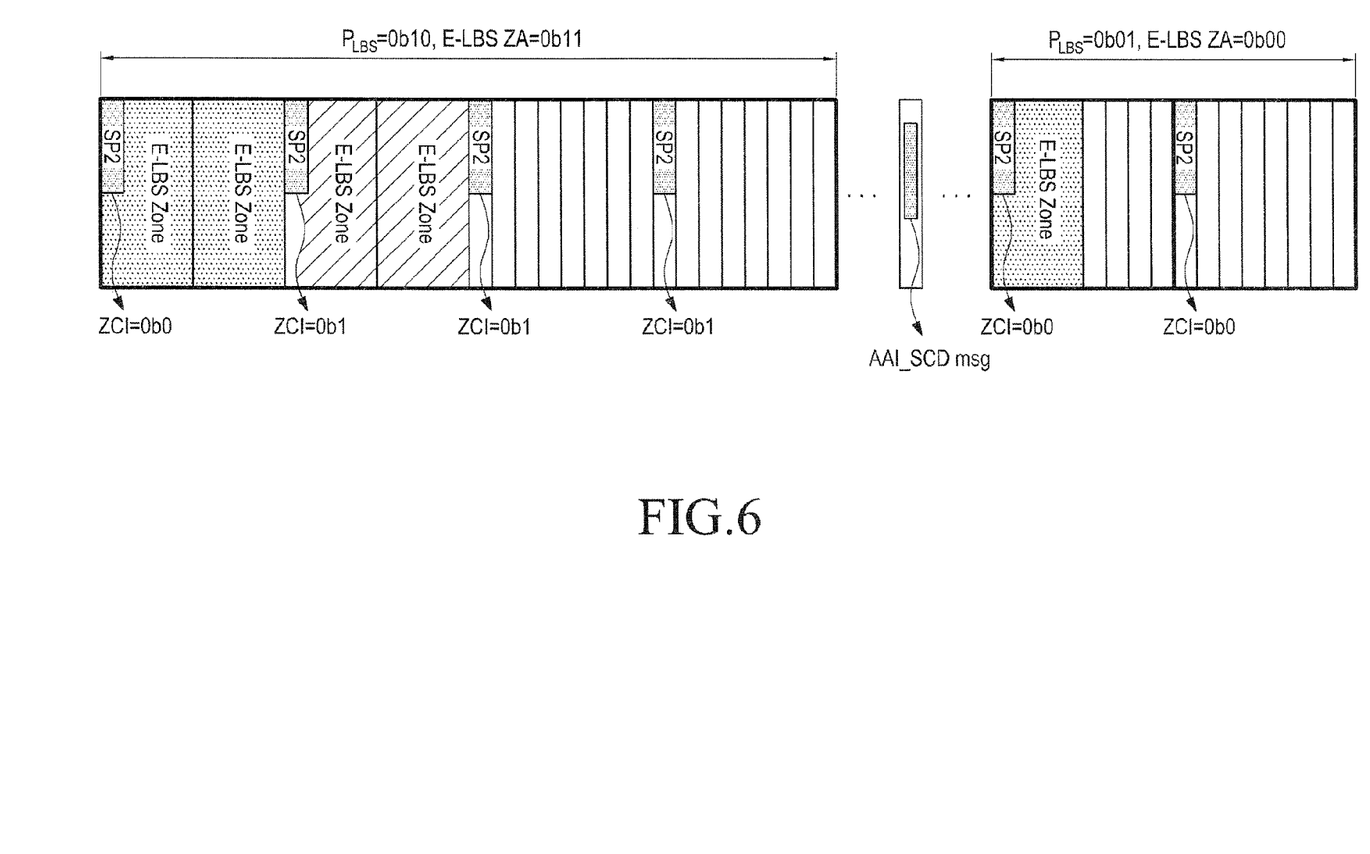
FIG. 6 is a diagram schematically illustrating a process of changing an E-LBS Zone allocation scheme in an IEEE 802.16m communication system according to an exemplary embodiment of the present invention.

FIG. 6 schematically illustrates a process of changing an E-LBS Zone allocation scheme in an IEEE 802.16m communication system according to an exemplary embodiment of the present invention.

Referring to FIG. 6, if the current E-LBS Zone allocation scheme is changed, an ABS uses a Zone Change Indicator (ZCI) to inform an AMS of the change in the E-LBS Zone allocation scheme. The ZCI is assumed to be included in an SFH, and assumed to be implemented with a 1 bit. If the bit value is '1', it indicates that an E-LBS Zone is not allocated beginning from its associated time.

It is shown in FIG. 6 that a ZCI included in a Secondary SFH (S-SFH) Subpacket 2 (SP2) is transmitted. The S-SFH SP2 is allocated in periods of 80 [ms]. For example, if it is assumed that an ABS changes from the current E-LBS resource allocation scheme in which $P_{LBS}$ represents 32 super frames and a bit value of 'E-LBS zone allocation' is '11', to a new current E-LBS resource allocation scheme in which $P_{LBS}$ represents 16 super frames and a bit value of 'E-LBS zone allocation' is '00', then the ABS sets a bit value of a ZCI included in an S-SFH SP2, to '1', and stops the E-LBS Zone allocation beginning from its associated time.

The AMS stops receiving E-LBS RS symbols until the next AAI_SCD message is received. Thereafter, the AMS receives an AAI_SCD message and detects E-LBS Zone allocation information from the received message. The AMS having detected the E-LBS Zone allocation information may receive the E-LBS in the above-described manner.

A process of changing an E-LBS Zone allocation scheme by an ABS in an IEEE 802.16m communication system according to an embodiment of the present invention is described below with reference to FIG. 7.

Figure 7:
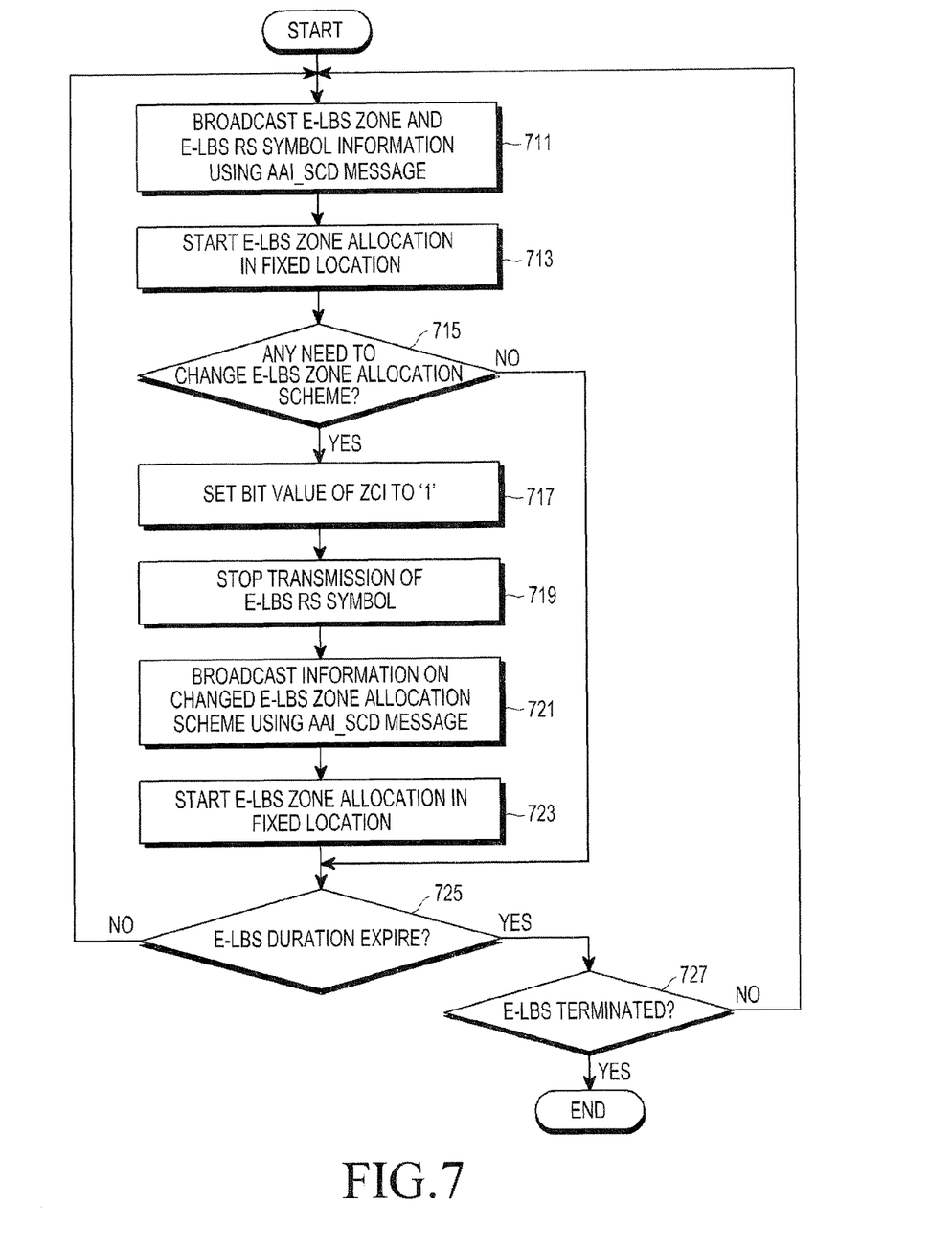
FIG. 7 is a flowchart illustrating a process of changing an E-LBS Zone allocation scheme by an ABS in an IEEE 802.16m communication system according to an exemplary embodiment of the present invention.

FIG. 7 illustrates a process of changing an E-LBS Zone allocation scheme by an ABS in an IEEE 802.16m communication system according to an exemplary embodiment of the present invention.

Referring to FIG. 7, an ABS periodically broadcasts E-LBS Zone and E-LBS RS symbol information using an AAI_SCD message in step 711. The ABS starts allocating E-LBS Zones from a predetermined fixed location in step 713, and determines in step 715 whether there is a need to change the current E-LBS Zone allocation scheme.

If there is a need to change the current E-LBS Zone allocation scheme, the ABS sets a bit value of a ZCI to '1' in step 717, and stops transmitting E-LBS RS symbols in step 719. In step 721, the ABS changes the E-LBS Zone allocation scheme, and broadcasts information about the changed E-LBS Zone allocation scheme using an AAI_SCD message. In step 723, the ABS starts allocating E-LBS Zones from a predetermined fixed location using the changed E-LBS Zone allocation scheme, and determines in step 725 whether E-LBS Duration has expired. If the E-LBS Duration has expired, the ABS determines in step 727 whether the E-LBS has been terminated. If the E-LBS has not been terminated, the ABS returns to step 711.

An operation of an AMS when an E-LBS Zone allocation scheme is changed in an IEEE 802.16m communication system according to an embodiment of the present invention will be described below with reference to FIG. 8.

Figure 8:
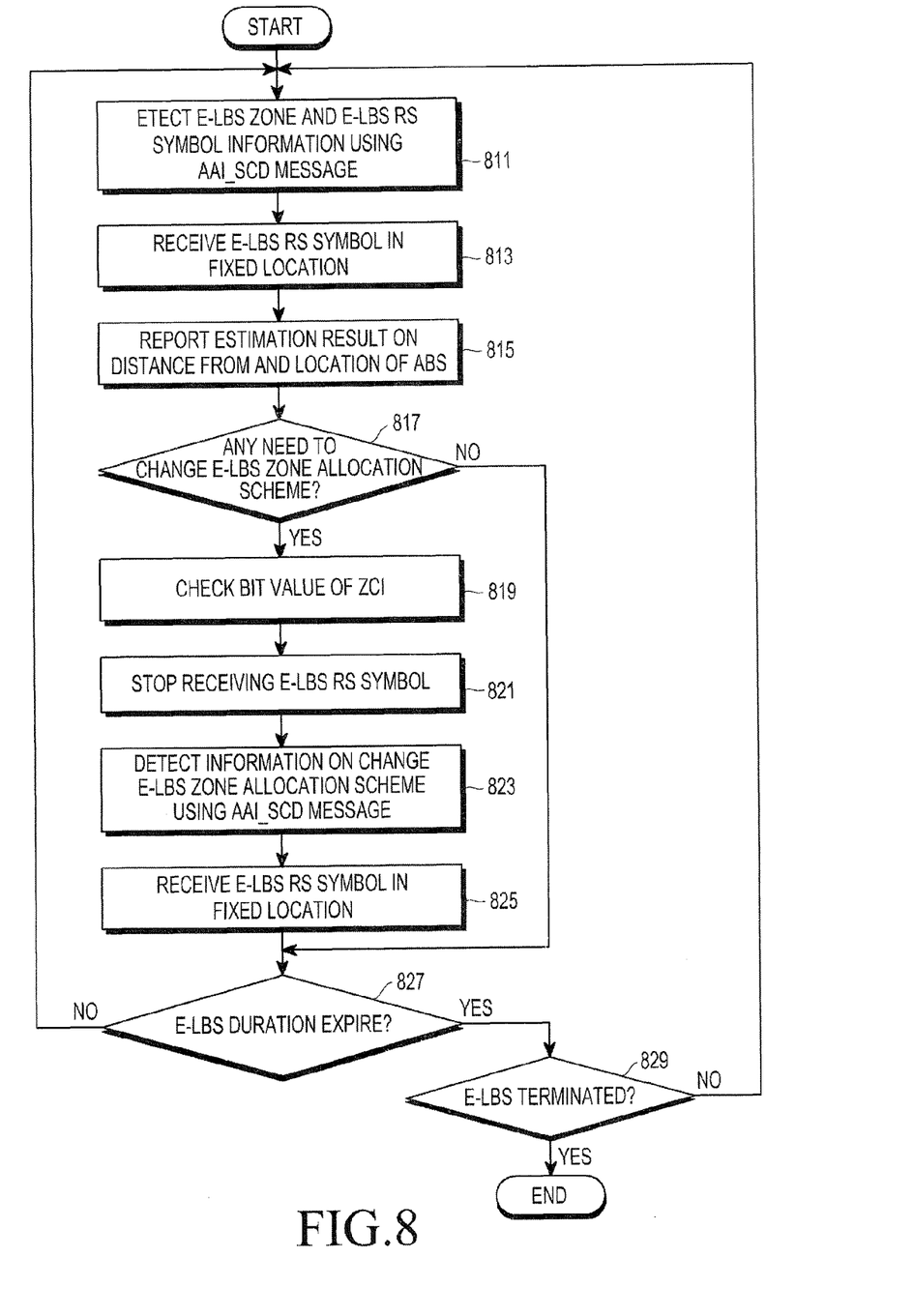
FIG. 8 is a flowchart illustrating an operation of an AMS when an E-LBS Zone allocation scheme is changed in an IEEE 802.16m communication system according to an exemplary embodiment of the present invention.

FIG. 8 illustrates an operation of an AMS when an E-LBS Zone allocation scheme is changed in an IEEE 802.16m communication system according to an exemplary embodiment of the present invention.

Referring to FIG. 8, an AMS detects E-LBS Zone and E-LBS RS symbol information from an AAI_SCD message periodically broadcasted by an ABS, in step 811. The AMS receives an E-LBS RS symbol in a predetermined fixed location in step 813, and the AMS estimates a distance from and a location of the ABS using the received E-LBS RS symbol and reports the estimation results to the ABS in step 815.

In step 817, the AMS determines if there is a need to change the current E-LBS Zone allocation scheme. If there is a need to change the current E-LBS Zone allocation scheme, the AMS checks a bit value of a ZCI included in an SFH in step 819. A bit value of the ZCI is assumed to be set to '1' because of the change in the E-LBS Zone allocation scheme.

The AMS stops receiving E-LBS RS symbols until the next AAI_SCD is received, in step 821, and detects information about the changed E-LBS allocation scheme, broadcasted from the ABS, using the next AAI_SCD message in step 823. The AMS receives an E-LBS RS symbol in a predetermined fixed location using the changed E-LBS Zone allocation scheme in step 825, and determines in step 827 whether the E-LBS Duration has expired. If the E-LBS Duration has expired, the AMS determines in step 829 whether the E-LBS has been terminated. If the E-LBS has not been terminated, the AMS returns to step 811.

An internal structure of an ABS in an IEEE 802.16m communication system according to an exemplary embodiment of the present invention is described below with reference to FIG. 9.

Figure 9:
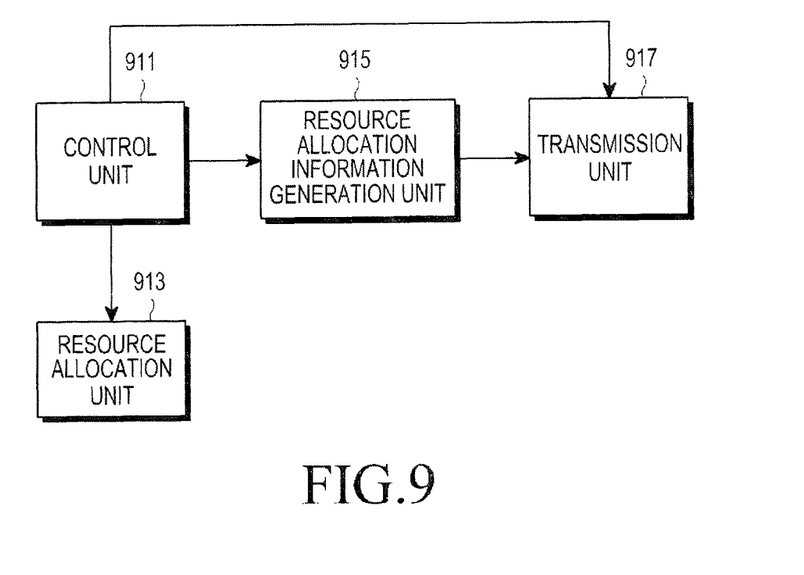
FIG. 9 is a diagram illustrating an internal structure of an ABS in an IEEE 802.16m communication system according to an exemplary embodiment of the present invention.

FIG. 9 illustrates an internal structure of an ABS in an IEEE 802.16m communication system according to an exemplary embodiment of the present invention.

Referring to FIG. 9, the ABS includes a control unit 911, a resource allocation unit 913, a resource allocation information generation unit 915, and a transmission unit 917. The ABS may include additional and/or different components.

The control unit 911 controls the overall operation of the ABS. The resource allocation unit 913 allocates resources, especially E-LBS Zones under control of the control unit 911.

Under control of the control unit 911, the resource allocation information generation unit 915 generates an AAI_SCD message representing resource allocation information, especially E-LBS Zone allocation information, and an AAI_SCD message including information indicating the provision/non-provision of the E-LBS. An operation of generating an AAI_SCD message by the resource allocation information generation unit 915 has been described above, so a detailed description thereof will be omitted herein. The transmission unit 917 transmits the AAI_SCD messages generated by the resource allocation information generation unit 915. The ABS serves as an AAI_SCD message transmission apparatus transmitting an AAI_SCD message.

Although the control unit 911, the resource allocation unit 913, the resource allocation information generation unit 915, and the transmission unit 917 are implemented as separate units in FIG. 9, two or more of the above units may be integrated in a single component.

An internal structure of an AMS in an IEEE 802.16m communication system according to an exemplary embodiment of the present invention is described below with reference to FIG. 10.

Figure 10:
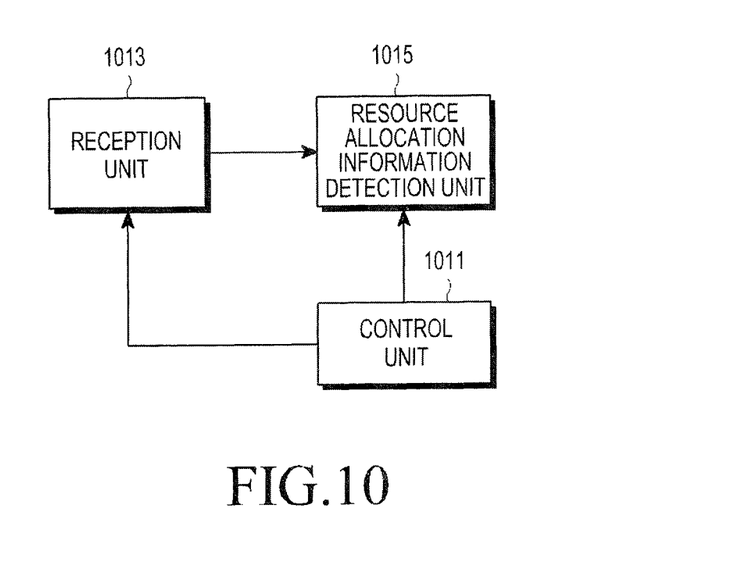
FIG. 10 is a diagram illustrating an internal structure of an AMS in an IEEE 802.16m communication system according to an exemplary embodiment of the present invention.

FIG. 10 illustrates an internal structure of an AMS in an IEEE 802.16m communication system according to an exemplary embodiment of the present invention.

Referring to FIG. 10, the AMS includes a control unit 1011, a reception unit 1013, and a resource allocation information detection unit 1015. The AMS may also include other components not shown in FIG. 10 for clarity.

The control unit 1011 controls overall operations of the AMS. The reception unit 1013 processes signals received from an ABS, and outputs the processed signals to the resource allocation information detection unit 1015. The resource allocation information detection unit 1015 detects resource allocation information, i.e., an AAI_SCD message, from the output signals of the reception unit 1013, and detects therefrom E-LBS Zone allocation information or information indicating provision/non-provision of the E-LBS. An operation of detecting the AAI_SCD message and detecting therefrom the E-LBS Zone allocation information or the information indicating provision/non-provision of the E-LBS has been described above, so a detailed description thereof will be omitted herein.

In other words, the AMS serves as an AAI_SCD message reception apparatus receiving an AAI_SCD message.

Although the control unit 1011, the reception unit 1013, and the resource allocation information detection unit 1015 are implemented as separate units in FIG. 10, two or more of these units may be integrated in a single component.

As is apparent from the foregoing description, exemplary embodiments of the present invention provide a method and apparatus for LBS resource allocation and transmission/reception of LBS resource allocation information in a mobile communication system employing the IEEE 802.16m standard, thereby enabling efficient provision of the LBS. Accordingly, exemplary embodiments of the present invention enable the provision of various LBS-based services in a mobile communication system employing the IEEE 802.16m standard, giving the communication service providers the opportunities to seek new profits, and allow users to enjoy a variety of LBS-based services, contributing to the activation of IEEE 802.16m-based services.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting Location Based Service (LBS) resource allocation information by an Advanced Base Station (ABS) in a mobile communication system, the method comprising:
   transmitting LBS resource allocation information including LBS zone configuration information representing an LBS zone transmission period,
   wherein the LBS zone configuration information includes at least one of first information indicating that LBS zone transmission is switched off, second information indicating that the LBS zone transmission period corresponds to a first number of super frames if the LBS zone transmission is switched on, third information indicating that the LBS zone transmission period corresponds to a second number of super frames if the LBS zone transmission is switched on, and fourth information indicating that the LBS zone transmission period corresponds to a third number of super frames if the LBS zone transmission is switched on.

2. The method of claim 1, wherein the LBS zone is switched on in a predetermined location.

3. The method of claim 2, wherein the predetermined location is determined based on the LBS zone transmission period and a superframe index.

4. The method of claim 3, wherein the predetermined location is a super frame determined in accordance with $$N_{superframe} \bmod P_{LBS} = 0$$

where $N_{superframe}$ represents the super frame index, mod represents a modulo operation, and $P_{LBS}$ represents the LBS zone transmission period.

5. The method of claim 4, wherein the LBS resource allocation information is transmitted through an Advanced Air Interface System Configuration Descriptor (AAI_SCD) message.

6. A method for receiving Location Based Service (LBS) resource allocation information by an Advanced Mobile Station (AMS) in a mobile communication system, the method comprising:
   receiving LBS resource allocation information including LBS zone configuration information representing an LBS zone transmission period,
   wherein the LBS zone configuration information includes at least one of first information indicating that LBS zone transmission is switched off, second information indicating that the LBS zone transmission period corresponds to a first number of super frames if the LBS zone transmission is switched on, third information indicating that the LBS zone transmission period corresponds to a second number of super frames if the LBS zone transmission is switched on, and fourth information indicating that the LBS zone transmission period corresponds to a third number of super frames if the LBS zone transmission is switched on.

7. The method of claim 6, further comprising detecting a location where the LBS zone is switched on.

8. The method of claim 7, wherein the location where the LBS zone is switched on is determined based on the LBS zone transmission period and a superframe index.

9. The method of claim 8, wherein the predetermined location is a super frame determined in accordance with $$N_{superframe} \bmod P_{LBS} = 0$$

where $N_{superframe}$ represents the super frame index, mod represents a modulo operation and $P_{LBS}$ represents the LBS zone transmission period.

10. The method of claim 9, wherein the LBS resource allocation information is received through an Advanced Air Interface System Configuration Descriptor (AAI_SCD) message.

11. An Advanced Base Station (ABS) in a mobile communication system, the ABS comprising:
   a transmission unit for transmitting Location Based Service (LBS) resource allocation information including LBS zone configuration information representing an LBS zone transmission period;
   wherein the LBS zone configuration information includes at least one of first information indicating that LBS zone transmission is switched off, second information indicating that the LBS zone transmission period corresponds to a first number of super frames if the LBS zone transmission is switched on, third information indicating that the LBS zone transmission period corresponds to a second number of super frames if the LBS zone transmission is switched on, and fourth information indicating that the LBS zone transmission period corresponds to a third number of super frames if the LBS zone transmission is switched on.

12. The ABS of claim 11, wherein the LBS zone is switched on in a predetermined location.

13. The ABS of claim 12, wherein the predetermined location is determined based on the LBS zone transmission period and a superframe index.

14. The ABS of claim 13, wherein the predetermined location is a super frame determined in accordance with $$N_{superframe} \bmod P_{LBS} = 0$$

where $N_{superframe}$ represents the super frame index, mod represents a modulo operation and $P_{LBS}$ represents the LBS zone transmission period.

15. The ABS of claim 14, wherein the LBS resource allocation information is transmitted through an Advanced Air Interface System Configuration Descriptor (AAI_SCD) message.

16. An Advanced Mobile Station (AMS) in a mobile communication system, the AMS comprising:
   a reception unit for receiving Location Based Service (LBS) resource allocation information including LBS zone configuration information representing an LBS zone transmission period,
   wherein the LBS zone configuration information includes at least one of first information indicating that LBS zone transmission is switched off, second information indicating that the LBS zone transmission period corresponds to a first number of super frames if the LBS zone transmission is switched on, third information indicating that the LBS zone transmission period corresponds to a second number super frames if the LBS zone transmission is switched on, and fourth information indicating that the LBS zone transmission period corresponds to a third number of super frames if the LBS zone transmission is switched on.

17. The AMS of claim 16, further comprising a control unit for detecting a location where the LBS zone is switched on.

18. The AMS of claim 17, wherein the location where the LBS zone is switched on is determined based on the LBS zone transmission period and a superframe index.

19. The AMS of claim 18, wherein the predetermined location is a super frame determined in accordance with $$N_{superframe} \bmod P_{LBS} = 0$$

where $N_{superframe}$ represents the super frame index, mod represents a modulo operation and $P_{LBS}$ represents the LBS zone transmission period.

20. The AMS of claim 19, wherein the LBS resource allocation information is received through an Advanced Air Interface System Configuration Descriptor (AAI_SCD) message.

* * * * *